No. 675,045. Patented May 28, 1901.
R. B. KITTREDGE.
FLOATING FISH TRAP.
(Application filed Feb. 1, 1901.)
(No Model.) 2 Sheets—Sheet 1.

No. 675,045. Patented May 28, 1901.
R. B. KITTREDGE.
FLOATING FISH TRAP.
(Application filed Feb. 1, 1901.)
(No Model.) 2 Sheets—Sheet 2.

Witnesses,

Inventor,
Ralph B. Kittredge
By Dewey Strong & Co.
Attys.

UNITED STATES PATENT OFFICE.

RALPH B. KITTREDGE, OF SAN FRANCISCO, CALIFORNIA.

FLOATING FISH-TRAP.

SPECIFICATION forming part of Letters Patent No. 675,045, dated May 28, 1901.

Application filed February 1, 1901. Serial No. 45,577. (No model.)

*To all whom it may concern:*

Be it known that I, RALPH B. KITTREDGE, a citizen of the United States, residing in the city and county of San Francisco, State of California, have invented an Improvement in Floating Fish-Traps; and I hereby declare the following to be a full, clear, and exact description of the same.

My invention relates to an apparatus which is designed for catching fish, such as salmon and the like, in large quantities.

It consists of a net having suitable floats upon its upper edges and anchors carried out transversely from each side, whereby the edges of the net are retained in approximately parallel positions, while the intermediate part falls down to the bottom of the water in which the net is anchored. The discharge end of the net is narrowed or tapered and has a netting forming a cap or cover at that end. Leads or guiding-nets are carried out from the entrance of the net in such a manner as to direct the fish into it, and weighted network gates are arranged to be closed behind the fish after the net is full. An independent trap or yard is arranged with relation to the net to receive any fish which start to leave the net upon the change of tide or for other reasons.

My invention also comprises details of construction, which will be more fully explained by reference to the accompanying drawings, in which—

Figure 1:
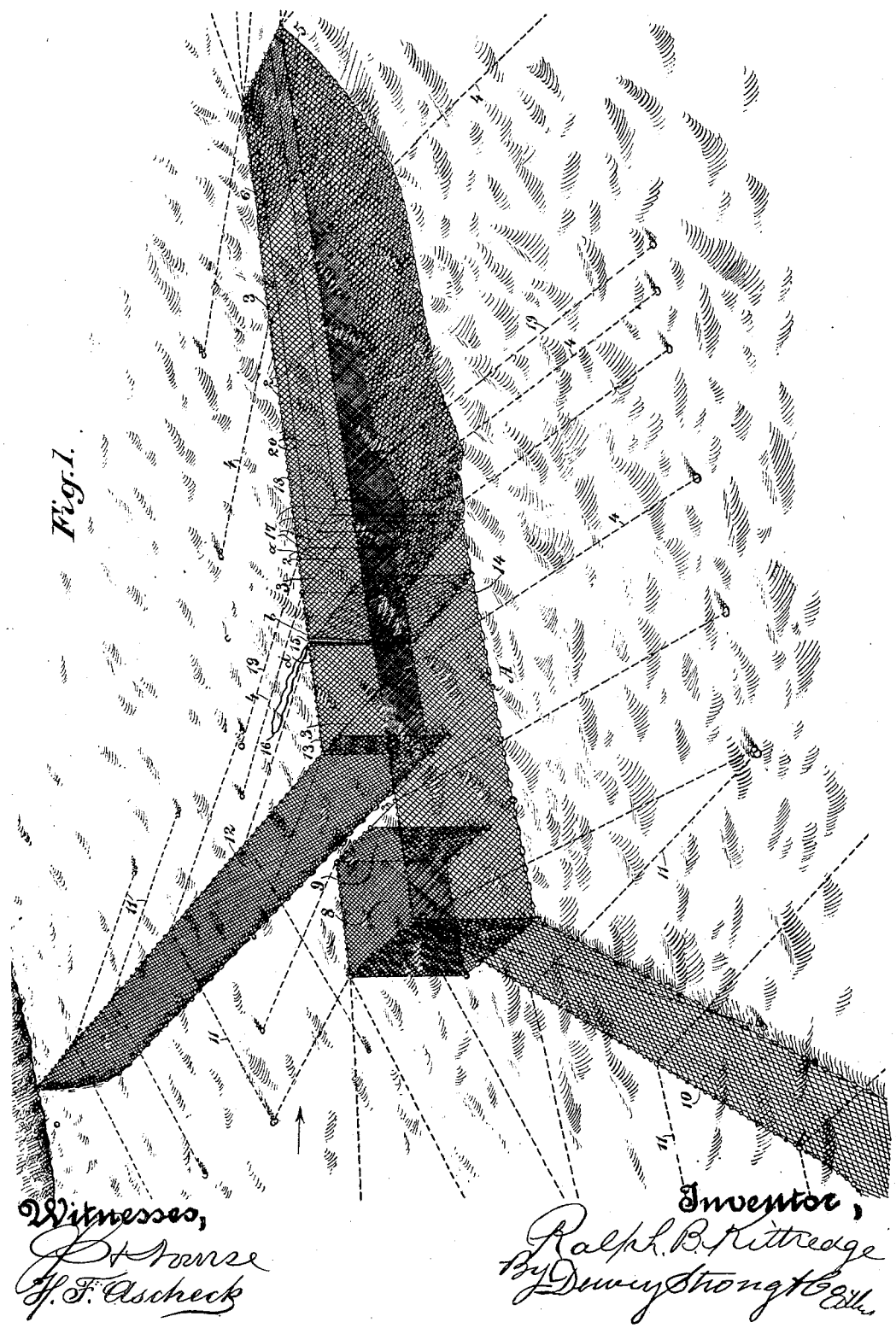
Figure 2:
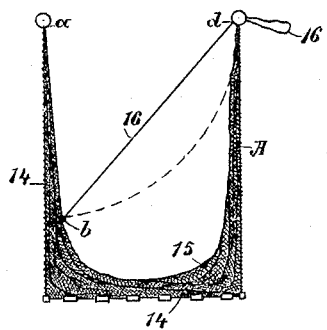
Figure 3:
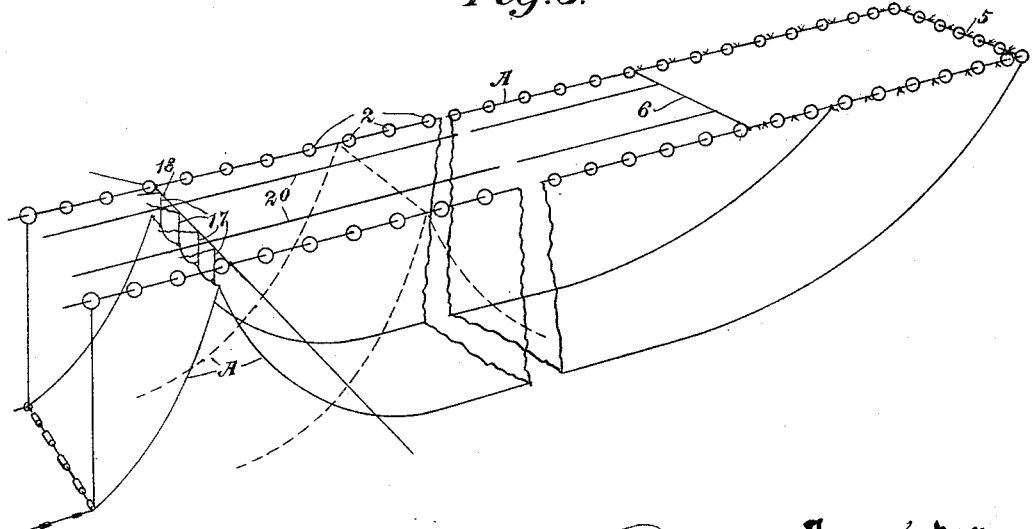

Figure 1 is a general view of the trap. Fig. 2 is a face view of the gate when opened. Fig. 3 is a view of the front portion of the trap, showing the manner of discharging the fish.

This apparatus is designed for the purpose of impounding salmon and like fish, which must be caught in large quantities to supply canneries. It consists of a net A, made of any suitable or desired length. The proportions may be eighty-nine fathoms in length by nine fathoms in width and seventeen fathoms in depth, more or less, according to requirements. The upper edges of the net are supported by buoys, as at 2, a portion of which may be made of cork, and another portion made of floating kegs or other sufficiently buoyant devices. The upper edges of the net are connected by lines, as 3, which limit the spread or opening transversely, and from the sides of the net, at the junction of the lines 3, anchor-lines 4 extend in either direction to as great a distance as may be necessary, and these serve to retain the net in proper alinement with relation to the tide. The intermediate rear portion of the net sweeps downward, so that the intermediate portion rests on the bottom of the waterway in which the net is anchored, and thus prevents any fish from escaping beneath it, being properly weighted. Such a net may be placed in any stream or waterway through which the fish are known to run. The opposite end to the inlet is tapered or narrowed to a discharge-point, as at 5, and as the fish become gathered into this portion of the net when discharging and are liable to jump over the sides this part is covered with a top portion, as at 6, extending back to as great a distance as may be found desirable to prevent any loss of fish. The other or rear end of the net has formed in it a trap or "yard," as it is called, as shown at 8, which is here shown as rectangular in shape and extending down to the bottom of the waterway in which the net is anchored. 9 is an interior side of this trap, which extends transversely part way across this portion of the net, leaving an opening between its inner edge and the opposite side of the net, through which the fish will run into the trap, when by change of tide any fish which are already partly within the main part of the net turn and start to go in the opposite direction. The fish when thus turned will follow the side of the net and will pass into this trap and will swim around within it, following the movement of the water until the tide again changes, when they will change their direction of movement and will then swim in the opposite direction, which will carry them out through the door of the trap and in line with the main portion A, previously described. This net is anchored with the discharge end in the direction of the inflowing tide and the inlet end toward the direction from which the tide flows in.

From one angle of the rear end of the trap extends a long net, which is called a "lead," as shown at 10. This also has its upper edge buoyant to float on the surface of the water, while its lower edge is sunk by weights or otherwise to the bottom, and it is retained in place by lines 11, extending transversely away from it, and suitable anchors at their outer ends. From the side of the net, at some distance from the wall 9 of the trap 8, extends another net or lead 12, similarly extended and anchored to the parts previously described. This may extend toward the shore or other point, and the space between its inner end and the wall 9 of the trap 8 is sufficiently large, so that the fish coming up with the tide will be guided by the leads 10 and 12 and, following the surfaces of these leads and the sides of the net, will eventually arrive at the open space through which they pass into the interior of the net.

In line with the lead-net 12 a wall or portion 13 extends part way across the width of the net, similar to the wall 9 of the trap previously described. These two walls act in conjunction when the tide turns, and any portion of the fish which have not yet got into the main portion A of the net turn with the tide to go in the opposite direction.

Across the net, a short distance in advance of the division 13, is a gate which is formed of a transverse netting, as 14 and 15. One upper angle of the net 14 is secured to the floats at one side of the main net and the other angle is drawn up to the opposite side by a line 16, by which it may be pulled up, so as to extend entirely across this portion of the net when it is desired to prevent the fish from running back, as when the tide has turned. This serves to retain all the fish in the main portion A of the net which have already reached that point, and those which are within the transverse boundaries of the net, but have not yet passed the gate 14, will be the ones saved by the trap 8, previously described.

Connected with the angle $b$ of the net is the upper angle of the net 15, and when the net 14 has been drawn up, so that its upper line $a\ b$ extends across the top, the net 15 will be folded up against the side of the main net.

When it is desired to open the net to allow the fish to enter, the rope or line 16 is loosened and allowed to run, and a suitable weight upon the upper part of the net 14 carries the upper edge down until it is in somewhat the position shown in the lines $a\ b\ d$, Fig. 2. At the same time it carries the edge of the net 15 down with it, and thus leaves a sufficient opening for the fish to pass through into the main portion of the net. When the net is to be emptied, a boat is taken into the space between the gate 14 and the discharge end, the gate being closed and the bottom of the net lying along the bottom of the waterway. The bottom is first drawn up by lines 17, the lower ends of which are connected with the bottom of the net and the upper ends to a transverse line 18, which extends across between the upper edges of the main net and is kept taut by anchor-lines 19, extending outwardly from it, similar to the lines 4, previously described. Between the transverse line 18 and the discharge end of the net are other lines 20, parallel with each other and with the sides of the net. The bottom of the net is then drawn up by those in the boat, and the bottom being brought to the surface of the water it is gradually "overhauled," as it is called—that is, the net is continually pulled up and the boat is advanced sidewise in the direction of the discharge end, and the fish will thus be forced along within the net until they arrive within the inclosed portion and can then be discharged into proper receptacles.

The net is graduated in depth from the surface at the discharge end to its extreme depth at the opposite or inlet end, where it is weighted to insure this portion being held down close to the bottom. This reduces the amount of net material to be acted on by tides and currents and to be overhauled to discharge the fish, and the fish are gradually brought to the surface and forced along to the discharge.

The hood or cover 6 is laced along the edges to the sides of the net, and at the front it is laced to front bottom edge of the net, so as to form a converging inclosure, into which the fish are finally driven and from which they are removed by unlacing this front end, and thus forming a directing-chute for their discharge.

Having thus described my invention, what I claim as new, and desire to secure by Letters Patent, is—

1. A net having the upper edges provided with buoys or floats, and the intermediate portion weighted to swing down to the bottom of the waterway, transverse connecting-lines extending between the sides and outwardly-extending anchor-lines by which the sides are maintained parallel and in the desired position, an opening near the inlet end of the net and guides or leads by which the fish are directed thereinto, a closable gate in advance of the inlet to retain the fish in the net, and a convergent or tapering covered portion at the discharge end of the net.

2. The combination in a fishing apparatus of a net having the separated and approximately parallel upper edges provided with buoys or floats, connecting-lines and divergent anchor-lines extending outward from the sides of the net, whereby it is maintained in position, with the intermediate portion of the net curving downward to the bottom of the waterway, guides or leads by which the fish are directed into the open receiving end of the net, and a network gate closable transversely to keep the fish within the net.

3. The combination in a fishing apparatus of a net having the upper edges provided with buoys or floats, connecting-lines and transversely-diverging anchor-lines by which the sides are maintained in an approximately parallel position with the intermediate portion weighted and curving downward to the bottom of the waterway, divergent guides or leads by which the fish are directed into the open receiving end of the net, and a gate consisting of two separate network sections having their edges attached to the opposite sides of the net, and their meeting sides provided with a connecting-cord whereby they may be drawn up to form a gate across the net or dropped so as to allow an inlet-passage therethrough.

4. The combination in a fishing apparatus of a buoyed and anchored net having approximately parallel sides, an inlet-opening at one end, a contracted discharge-opening at the opposite end, a flexible gate near the inlet end consisting of a network section attached to one side of the net and having its free side and angle movable to extend across the net, a cord connecting with said angle, a second net attached to the opposite side of the main net and having its angle connected with the cord and weighted whereby the connected angles are caused to drop downwardly when the cord is loosened and form a passage for the fish, said angles being drawn up by pulling upon the cord so as to form a gate across the net.

5. The combination in a fishing apparatus of a net having buoys or floats upon its upper edges and connecting and anchor lines by which said edges of the net are maintained in an approximately parallel position and in the line of flow of the tide, the intermediate portion of the net being weighted so as to sink upon the bottom of the waterway, and a closed trap formed at the inlet end of the net, guides or leads, one of which is divergent from one side of said trap, and the other from the main portion of the net, an intermediate open space between the trap and the second guide-net, transverse portions extending part of the way across the net and forming gates to the trap, and a supplemental flexible gate within the inlet end of the main net, with means whereby it may be opened to allow the passage of fish, or closed to impound them.

6. The combination in a fishing apparatus of a net having its edges provided with floats or buoys, connecting and anchor lines by which said edges are maintained in the line of the tide flow, weights upon the intermediate portion of the net by which it is caused to sink to the bottom of the waterway, a contracted inclosed discharge end of the net, an inlet end with guides or leads divergent therefrom, and a trap for impounding returning fish, lines stretched within the sides of the main net and approximately parallel therewith, a line transverse to the upper part of the net with which they are connected, other lines extending therefrom and connecting with the bottom of the net whereby the latter may be pulled up to the surface and overhauled so as to gradually force the fish to the outlet end of the net.

7. A fishing apparatus for waterways, consisting of a net with floats or buoys for its upper edges, connecting-lines between and outwardly-extending anchor-lines, an inlet and guides therefor, said net being narrowed toward its discharge end, and a hood or cover laced to the sides and across the discharge end.

In witness whereof I have hereunto set my hand.

RALPH B. KITTREDGE.

Witnesses:
S. H. NOURSE,
CHAS. E. TOWNSEND.